United States Patent [19]

Halloran

[11] Patent Number: 4,943,705
[45] Date of Patent: Jul. 24, 1990

[54] TISSUE WARMING APPARATUS

[76] Inventor: Michael R. Halloran, 37627 Duffle St., Palmdale, Calif. 93550

[21] Appl. No.: 345,845

[22] Filed: May 1, 1989

[51] Int. Cl.⁵ .............................................. H05B 3/26
[52] U.S. Cl. .................................... 219/385; 219/521
[58] Field of Search ............... 219/385, 386, 521, 200, 219/201

[56] References Cited

U.S. PATENT DOCUMENTS

| | | | |
|---|---|---|---|
| 2,277,605 | 3/1942 | Palitzsch | 219/521 |
| 2,604,573 | 7/1952 | Raines | 219/521 |
| 3,105,138 | 9/1963 | Gazdik | 219/521 |
| 3,432,641 | 3/1969 | Welke | 219/521 |
| 4,694,973 | 9/1987 | Rose | 219/385 |
| 4,700,048 | 10/1987 | Levy | 219/521 |

Primary Examiner—Teresa J. Walberg
Attorney, Agent, or Firm—Roger A. Marrs

[57] ABSTRACT

A device for warming pre-moistened wipes, such as for use in cleansing an infant and/or body wipes. A container for storing a plurality of wipes is placed onto a warmer and left there. An integral thermostat maintains the temperature at a constant 100° F. The warmer is water and fire resistant. The surface of one side is designed for small containers while the other side is for larger containers.

2 Claims, 1 Drawing Sheet

TISSUE WARMING APPARATUS

BACKGROUND OF THE INVENTION

1. Field of the Invention

This invention relates to a warmer for a towelette container which warms the towelettes as they are removed from the container.

2. Brief Description of the Prior Art

Containers for a plurality of flexible elements from which the elements may be removed one after the other are in common use. In one particular embodiment, the flexible elements are in the form of moist towelettes used for baby hygiene. Because the towelettes are moist, usually as a result of the presence in them of liquids which tend to evaporate rapidly, the towelettes when applied to the skin have a very marked cooling effect. While for adults this may often be considered pleasant, for infants, the sudden application of a cooling towelette is unsettling and frequently leads to distress. It, therefore, is desirable to provide a means for warming the towelettes before they are applied to the baby's skin, thereby to avoid any undesirable shock.

Customarily, the towelettes are sold in plastic containers having a removable top with an opening through which the towelettes can pass, the removal of one towelette by pulling it through that opening bringing the next succeeding towelette to a position where its leading end passes through the opening and is left in a position to be grasped and pulled when the next towelette is desired. The individual containers are disposable once they have been emptied of their contents.

Difficulties and problems have been encountered with a multiplicity of devices intended to support such towelette containers so that the towelettes can be warmed prior to use. These problems stem from the fact that warmers have a tendency to apply heat over a long period of time which will dry the towelettes in the container and, therefore, reduce their effectiveness when the time comes to employ individual towelettes for their intended purpose. Also, high voltage systems are sometimes required which are dangerous and which require elaborate electrical systems to meet underwriter approval and to protect the warming device. A further problem resides in the fact that the towelette containers are of different configurations, such as cylindrical containers and square-shaped containers, so that prior warmers are not adapted to handle both types. Therefore, conventional warmers are specifically designed to accommodate either one shape or configuration of container while another warmer will be adapted to handle other shapes and configurations. Prior towelette warmers also require extensive construction and assembly since the warming system is generally integrally incorporated into the towelette container itself and, in many instances, includes other features such as lights and the like. This complicates the construction and usage of the device.

Therefore, a long standing need has existed to provide a simple warming device which will accept a variety of towelette container configurations and shapes so that the internally stored moistened towelettes will be warmed without drying them out. Such a warmer should use low voltage electronics for producing heat to achieve the warming effect.

SUMMARY OF THE INVENTION

Accordingly, the above problems and difficulties are obviated by the present invention which provides a novel warming device for warming the plurality of towelettes stored in a container preparatory for dispensing, which comprises a base having opposite circular side rails or side walls which are of different diameters in order to respectively receive the bottom portion of conventional towelette containers at the selection of the user. Each circular flange or side wall is provided with a plurality of spaced-apart notches intended to insertably receive corner portions of a square-shaped towelette container while an arcuate radius integrally joins the inside surface of each flange or side wall with a flat bottom surface so as to readily accommodate the cylindrical bottom of other types of towelette containers.

The base is further provided with an internal channel or passageway including component cavities for housing the electrical system necessary for effecting warming of the towelettes in the supported container. In one example, the electrical system includes a pair of resistors connected in series with a thermostat so that the resistors provide heating elements when electricity is supplied via an electrical cord.

Therefore, it is among the primary objects of the present invention to provide a simple warming device for supporting a container of moist towelettes so that the respective towelettes are warmed immediately prior to dispensing.

Another object of the present invention is to provide a novel warming device for conventional towelettes stored in cylindrical or square-shaped containers so that a variety of variously shaped containers can be supported about the bottom thereof for warming of the stored towelettes.

Yet another object of the present invention is to provide a warming plate adapted to support a variety of differently shaped towelette containers about the bottom thereof and which includes resistance heating elements powered by low voltage.

Yet another object of the present invention is to provide a towelette container warming plate which includes an electrical circuit operable by low voltage that is completely encased in the base of the warmer so that electrical elements are not exposed to the surrounding environment.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
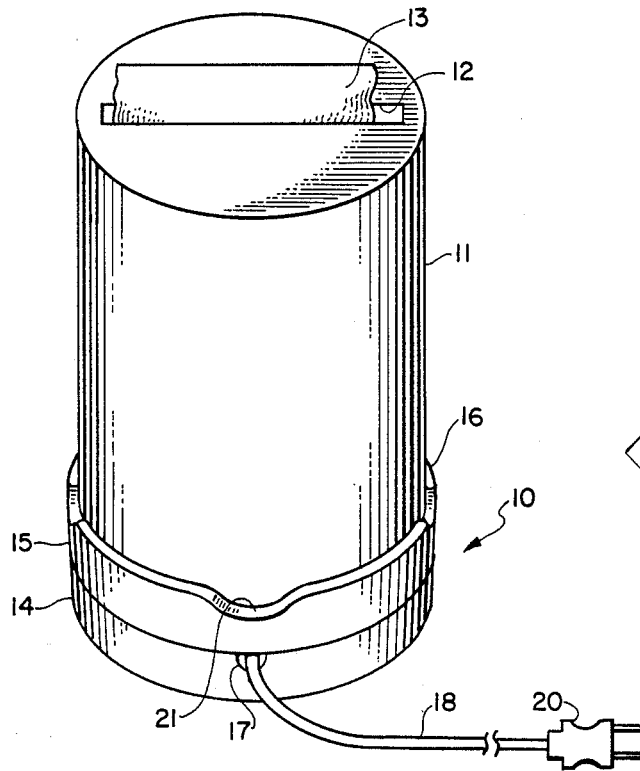
FIG. 1 is a front perspective view of the novel warming device supporting a conventional towelette container.

Referring to FIG. 1, the novel container warmer of the present invention is illustrated in the general direction of arrow 10 which is illustrated as supporting a cylindrical storage container 11 housing a plurality of moistened towelettes of which the uppermost towelette is projecting through a dispensing slot 12 and is identified by numeral 13. It is to be understood that the container and manner of storing the towelettes do not form a part of the present invention. In use, the container rests against the top surface so as to be supported by the warmer 10 and the towelettes 13 are available for grasping by the fingers of the user. Heat from the warmer will penetrate the container 11 and substantially warm the interior thereof so that the towelettes are warmed preparatory for dispensing through the slot 12.

The warmer 10 includes a base having a lower member 14 supporting an upper member 15. Each member of the base includes a depression or cavity into which only the bottom of the container 11 is situated. As illustrated in FIG. 1, the bottom of container 11 is supported on the base member 15 wherein a portion of the bottom and side wall of the container occupies a cavity defined by an annular side wall 16. The diameter of the cavity measured from opposing surfaces of the side wall 16 is of sufficient dimension so that the cylindrical bottom of container 11 will be insertably received therein and supported on the base. Therefore, it is to be understood that the diameter of the cavity for each of the members 14 and 15 is critical so as to accommodate different cylindrical or diameter dimensions of containers. It is also to be noted that the base member 14 includes an opening 17 permitting an electrical cord 18 having a plug 20 to communicate exteriorly of the warmer 10. The prongs on plug 20 are to be insertably received into a nearby electrical socket so that power is available and supplied to the electrical circuit carried within the base 10.

Figure 2:
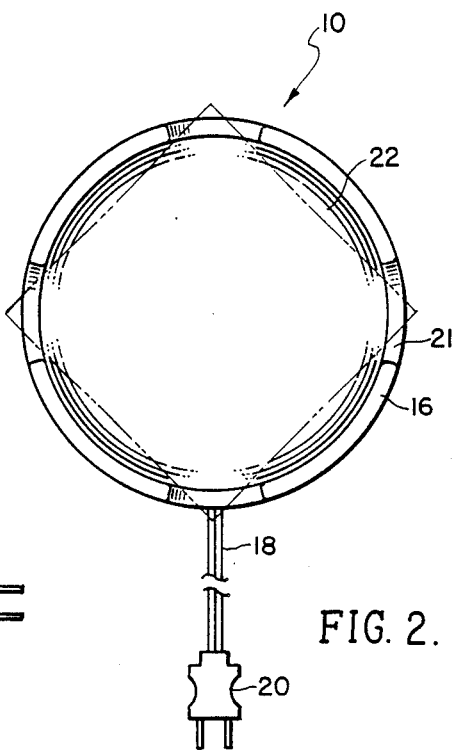
FIG. 2 is a top plan view of the warming device illustrating the device's ability to support containers having square corners.

Referring now in detail to FIGS. 1 and 2, it can be seen that the base of the warmer is provided with means for accommodating other than a cylindrical container. Such means includes a plurality of notches, such as notch 21, into which a corner of a square or rectangular container is insertably accommodated. The other corners of the container are placed into additional notches formed in the side wall 16. The cavity is indicated by numeral 22 and it is to be understood that the bottom of a square or rectangular container will rest against the bottom of the cavity 22 since the notches downwardly extend from the upper edge of the side wall to the surface of the upper base member 15 defining the bottom of the cavity 22. Therefore, as the warmer is heated, the heat is transferred into the container 11 and then to the plurality of moistened towelettes contained in the interior thereof.

Figure 3:
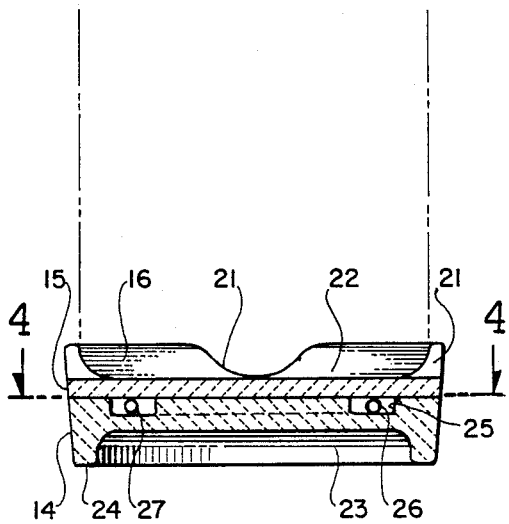
FIG. 3 is a transverse cross-sectional view of the warming device as shown in FIGS. 1 and 2.

Referring now in detail to FIG. 3, it can be seen that the side wall 16 is carried on the base member 15 and upwardly projects to define the cavity 22 for insertably receiving the lower end of the container 11. However, it is to be particularly noted that the lower base member 14 includes a depression or cavity 23 which is of a lesser diameter than the diameter of the cavity 22. Therefore, when desired, the warmer 10 can be turned upside down so that the base member 15 is on the bottom and the base member 14 is facing upwardly so that a container of cylindrical configuration which is of lesser diameter can be fitted into the cavity 23. Furthermore, it is to be noted that the cross-sectional shape of the warmer is frustro-conical so that the exterior circular side of the warmer tapers in dimension from the top of side wall 16 to the terminating edge of a side wall 24 that defines the cavity 23. Furthermore, FIG. 3 illustrates that a selected one of the base members, such as base member 14, includes a channeling or passageway, as indicated by numeral 25, which accommodates and encases the electrical circuit represented by a resistor 26. The channel or passageway is sealed by placement of the base member 15 against the opposing surface of base member 14 where the opposing surfaces are joined by adhesive or other sealing means.

Figure 4:
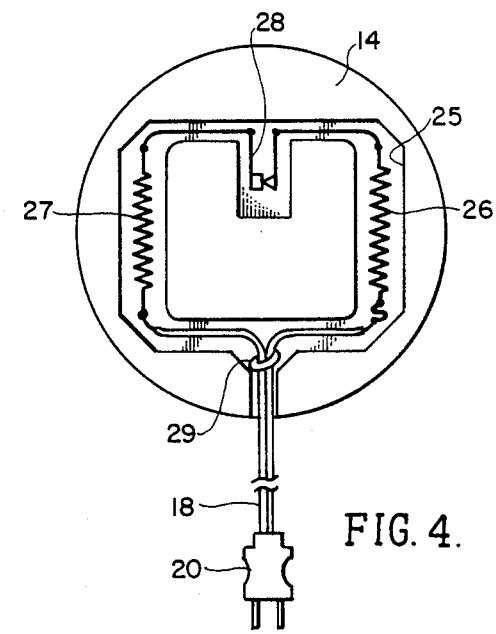
FIG. 4 is a cross-sectional view of the warming device showing the electrical circuit as taken in the direction of arrows 4—4 of FIG. 3.

Referring now in detail to FIG. 4, it can be seen that the passageway 25 is occupied by the electrical circuit which includes not only resistor 26 but resistor 27 that are connected in series with a thermocouple 28. The opposite ends of the resistors are connected to the cable 18 connected to the plug 20. A knot 29 is formed in the cord or cable 18 which serves as a strain relief so that stress placed on the cord will not disrupt or disconnect from the resistors 26 and 27. Heat generated by the resistors is transferred through the base members to the respective container supported on the warmer. The thermocouple 28 is employed as a means for intermittently breaking the circuit as a means of controlling temperature so that the electrical circuit will not overheat. Also, if desired, other safety precautions may be taken such as the inclusion of conventional fuses or the like.

Therefore, it can be seen from the foregoing that the warmer of the present invention is separable from the container 11 and does not form an integral part therewith. The warmer includes alternate receptacles 22 and 23 into which the bottom of a conventional container 11 may be insertably disposed for support on the warmer. The warmer can accommodate not only cylindrical containers but may also accommodate containers having square corners by means of the plurality of notches 21. Each notch 21 is rounded or arcuate and each of the respective side walls 16 and 24 includes an arcuate radius integrally connecting the inside wall surface of walls 16 and 24 respectively with the bottoms of the cavities or receptacles 22 and 23. In this manner, maximum heat is transferred from the resistors through the warmer to the interior of the container 11.

The warmer 10 may be constructed of modern ceramic material and electric components having a round shape 5 11/16" in diameter and 1¾" thick. The circumference tapers 1/16" along the thickness and both top and bottom base members are recessed and have a wall around the circumference. The depth of the top cavity or recess is 5¼" in diameter and the bottom recess is 4¾" in diameter. The former has a ⅜" radius where the vertical wall meets the horizontal flat section and the latter has a ¼" radius. The heating elements are contained within the ceramic base members, and consist of resistance heating elements, a thermostat control and a fusible link. These are arranged in a conventional heater circuit. The thermostat is not adjustable, but is preset to maintain a 100° F. temperature. A power cord 10 exits one side of the base and terminates with a three-pronged grounded plug 22. The circuit may be altered to utilize a 12 VDC power source as well.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A tissue warming apparatus comprising:
   a storage container for releasably holding a plurality of pre-moistened wipes;
   a warmer having a peripheral upright wall defining a receptacle for insertably receiving said storage container;
   resistance heater means included in said warmer having a integral thermostat for maintaining said heater means at a constant 100 degrees Fahrenheit;
   said warmer being characterized as composed of water and fire-resistant composition;
   said upright wall is a first circular wall extending from outside of said warmer; and
   a second raised circular wall of larger diameter than said first wall carried on the opposite side of said warmer.

2. The invention as defined in claim 1 wherein:
   said warmer is constructed from a pair of halves;
   each half having a flat bottom and carrying its respective first and second wall on its side opposite from said bottom;
   a selected one of said halves having a cut-out groove in its flat bottom for supporting said heater means; and
   said flat bottom of said respective halves adapted to be joined together covering said heater means so that said respective walls project outwardly from opposite side of said warmer.

* * * * *